(12) United States Patent
Husted et al.

(10) Patent No.: US 8,504,889 B2
(45) Date of Patent: Aug. 6, 2013

(54) SLEEP CLOCK ERROR RECOVERY SCHEME

(75) Inventors: Paul J. Husted, San Jose, CA (US);
William J. McFarland, Los Altos, CA (US); David K. Su, Cupertino, CA (US)

(73) Assignee: QUALCOMM Incorporated, San Diego, CA (US)

(*) Notice: Subject to any disclaimer, the term of this patent is extended or adjusted under 35 U.S.C. 154(b) by 423 days.

(21) Appl. No.: 12/945,067

(22) Filed: Nov. 12, 2010

(65) Prior Publication Data
US 2012/0124444 A1 May 17, 2012

(51) Int. Cl.
*H04L 1/18* (2006.01)
(52) U.S. Cl.
USPC ................ 714/749; 714/55; 714/748
(58) Field of Classification Search
USPC ........................... 714/55, 748, 749
See application file for complete search history.

(56) References Cited

U.S. PATENT DOCUMENTS

| | | | |
|---|---|---|---|
| 5,953,648 A * | 9/1999 | Hutchison et al. ......... | 455/343.4 |
| 6,735,454 B1 * | 5/2004 | Yu et al. .................. | 455/574 |
| 8,402,301 B2 * | 3/2013 | Venable, Sr. ............. | 713/400 |
| 2006/0135145 A1 | 6/2006 | Redi ...................... | 455/420 |
| 2006/0285579 A1 * | 12/2006 | Rhee et al. .............. | 375/132 |
| 2007/0105525 A1 * | 5/2007 | Wang et al. ............. | 455/343.1 |
| 2007/0258508 A1 * | 11/2007 | Werb et al. ............. | 375/140 |
| 2009/0067407 A1 * | 3/2009 | Jia et al. ................ | 370/350 |
| 2009/0070617 A1 * | 3/2009 | Arimilli et al. .......... | 713/400 |
| 2009/0100029 A1 * | 4/2009 | Jain et al. ............... | 707/4 |
| 2009/0273463 A1 * | 11/2009 | Morwood et al. ......... | 340/514 |
| 2009/0319670 A1 * | 12/2009 | Kang ..................... | 709/227 |
| 2010/0192212 A1 * | 7/2010 | Raleigh .................. | 726/7 |
| 2011/0299421 A1 * | 12/2011 | Werb et al. ............. | 370/252 |
| 2012/0124444 A1 * | 5/2012 | Husted et al. ........... | 714/748 |

FOREIGN PATENT DOCUMENTS

WO WO02058276 A1 7/2002

OTHER PUBLICATIONS

"10 Channel Control", Bluetooth Specification Version 1.0 B, Nov. 29, 1999, pp. 95-126, XP002937254.
International Search Report and Written Opinion—PCT/US2011/060383—ISA/EPO—Mar. 19, 2012.

* cited by examiner

*Primary Examiner* — Joshua Lohn
(74) *Attorney, Agent, or Firm* — Bay Area Technology Law Group (57) ABSTRACT

A wireless device includes a functional unit, a wireless transceiver, an antenna and a clock. The wireless transceiver and antenna are coupled to the functional unit. The clock is coupled to the functional unit and the wireless transceiver. The clock is generates a clock signal. The wireless device is coupled wirelessly to a wireless slave device. The functional unit is configured to determine an amount of time since a last keep alive transmission with the slave device has occurred based on the clock. The functional unit determines a number of keep alive transmissions to transmit to the slave device, and appropriate transmission times for the keep alive transmissions relative to a next scheduled keep alive transmission time, based on the determined amount of time since the last keep alive transmission. The functional unit begins successive transmission of the keep alive transmissions to the slave device per the transmission times.

20 Claims, 5 Drawing Sheets

| | slots | time (ms) | 250ppm (us) | 1.25ms frames |
|---|---|---|---|---|
| 404 | 20 | 12.5 | 3.125 | 0.0025 |
| 406 | 160 | 100 | 25 | 0.02 |
| 406 | 320 | 200 | 50 | 0.04 |
| 408 | 1024 | 640 | 160 | 0.128 |
| 410 | 2048 | 1280 | 320 | 0.256 |
| 412 | 4096 | 2560 | 640 | 0.512 |
| 414 | 8192 | 5120 | 1280 | 1.024 |
| | 16384 | 10240 | 2560 | 2.048 |

SLEEP CLOCK ERROR RECOVERY SCHEME

BACKGROUND OF THE INVENTION

1. Field of the Invention

This invention relates to wireless communications and, more particularly, to the design of more stable low-power oscillators.

2. Description of the Related Art

Bluetooth is a wireless protocol for exchanging data over short distances (using short length radio waves) from fixed and mobile devices. Bluetooth is intended for low power applications, and is often used in devices such as faxes, mobile phones, telephones, laptops, personal computers, printers, Global Positioning System (GPS) receivers, digital cameras and video game consoles. Bluetooth uses a radio technology called frequency-hopping spread spectrum, which partitions the data being sent and transmits chunks of the data on up to 79 bands of 1 MHz width in the range 2402-2480 MHz.

A Bluetooth wireless link is formed in the context of a piconet. A piconet comprises two or more devices that occupy the same physical channel (which means that they are synchronized to a common clock and hopping sequence). The common (piconet) clock is identical to the Bluetooth clock of one of the devices in the piconet, known as the master of the piconet, and the hopping sequence is derived from the master's clock and the master's Bluetooth device address. All other synchronized devices are referred to as slaves in the piconet.

Bluetooth is a packet-based protocol with a master-slave structure. One master may communicate with up to 7 slaves in a piconet; all devices share the master's clock. Packet exchange is based on the basic clock, defined by the master, which ticks at 312.5 µs intervals. Two clock ticks make up a slot of 625 µs; two slots make up a slot pair of 1250 µs. In the simple case of single-slot packets the master transmits in even slots and receives in odd slots; the slave, conversely, receives in even slots and transmits in odd slots. Packets may be 1, 3 or 5 slots long but in all cases the master transmit will begin in even slots and the slave transmit in odd slots.

The Bluetooth specification includes a low power mode referred to as sniff mode, which more generally may be referred to as a low power sleep mode, or simply sleep mode for brevity. In sniff mode, devices that are not actively communicating can enter a low power (sleep) state, while periodically sending "keep alive" messages or transmissions to each other. In other words, in sniff mode the transmitter and receiver devices which have established a communication link periodically communicate with each other to maintain the link. For example, where a user is using a Bluetooth keyboard or mouse, and has not provided input for a certain period of time, the keyboard or mouse will enter the low power sniff mode, and the Bluetooth master device (host computer) will periodically communicate with the slave device (the keyboard or mouse) to maintain the link. Sniff mode provides the greatest benefit to battery operated human interface devices, and provides increased battery life for these devices.

The Bluetooth specification requires that a Bluetooth device maintain a 3.2 kHz Bluetooth clock, even during sleep. During sleep, Bluetooth requires that the clock be maintained to within 250 ppm+/−10 µs. Where a device includes an internal low power oscillator (LPO), the internal LPO circuitry may occasionally create a clock that drifts more than 250 ppm. This drift may be due to noise, a change in temperature, supply voltage variations, or a combination of the above.

In cases where the Bluetooth device clock drifts by more than 250 ppm, two devices may have difficulty maintaining the communication link during sniff mode. This is because, due to the difference in clocks of the master and slave devices, the master may transmit a sniff message while the slave device is asleep. For a slave device in a sniff link, it is possible for the slave device to open up its scanning window to be able to find the master transmitter. The slave device may typically open its window by a desired amount, to allow for the 250 ppm allowable clock drift error range on both sides of the link.

However, even in the case where the slave device increases its scanning window, the master device may still transmit a sniff communication when the slave device is in sleep mode. For example, the master cannot assume that the slave will open up its receive window for more than +/−250 ppm, nor can it request the slave to do so. The master device needs to perform the master transmission on time and in the appropriate frequency (as determined by the clock), or the link will drop after the expiration of a link supervision timeout (during which timeout there may be a negotiated or programmable number of attempts to revive the link).

Other corresponding issues related to the prior art will become apparent to one skilled in the art after comparing such prior art with the embodiments described herein.

SUMMARY OF THE INVENTION

Embodiments of the invention relate to maintaining a communication link between devices in a wireless communication system, e.g., a Bluetooth system. The wireless communication system includes a master device and one or more slave devices. When a slave device enters a low power mode (or sleep mode), the master device periodically sends keep alive messages to the slave device to maintain the communication link. In some embodiments, the master device is configured to determine an amount of time since a last successful keep alive transmission was sent to a slave device. The master device may then determine the appropriate number of keep alive transmissions, and appropriate transmission times for the keep alive transmissions, based on the determined amount of time since the last keep alive transmission. The master device may then transmit the plurality of keep alive messages at the scheduled times to maintain the communication link.

BRIEF DESCRIPTION OF THE DRAWINGS

Objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note that the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to." The term "coupled" means "directly or indirectly connected."

DETAILED DESCRIPTION

Embodiments of the invention described herein may be used in any of various wireless communications systems which include a "sleep mode" and which utilize messages transmitted between two devices, where at least one of the two devices may be placed in a low power mode, to maintain the communication link between the two devices. Embodiments are described below in the context of a Bluetooth system. As used herein, the term "Bluetooth" refers to the Bluetooth wireless communication standard, including past, present and future versions of the standard. It is again noted that the embodiments below are exemplary and that embodiments may apply to other similar types of systems. Note further that the terms "sleep mode" and "sleep frame", are used herein to refer generically to, or corresponding to, Bluetooth-specific terms "sniff mode" and "sniff frame", respectively. Additionally, as used herein, the term "keep alive transmission" or "keep alive message" is used to refer generically to, or corresponding to, the Bluetooth-specific term "sniff packet".

Figure 1:
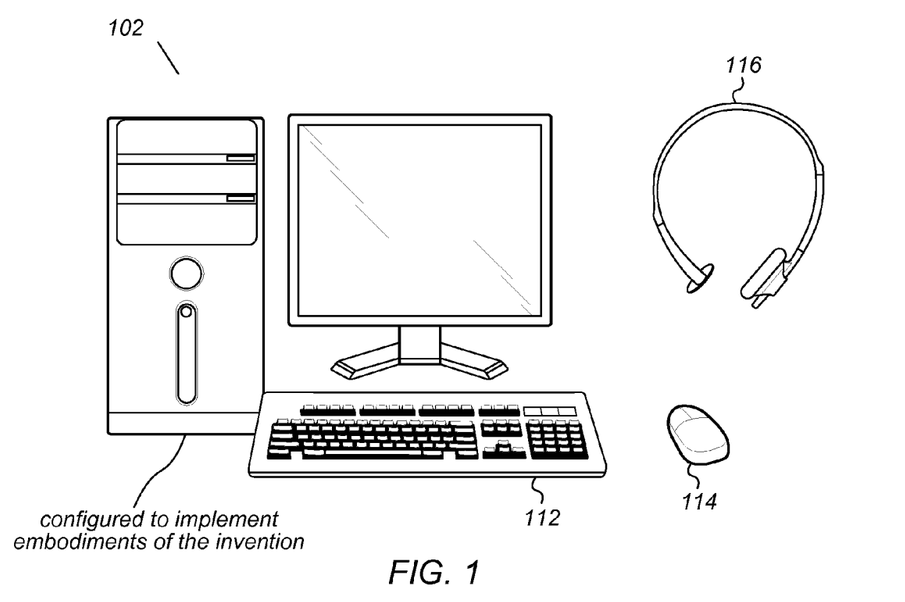
FIG. 1 shows a Bluetooth system including example Bluetooth devices.

FIG. 1 illustrates an example wireless communication system according to one embodiment. The example system of FIG. 1 is a Bluetooth system. The example system comprises a computer system 102 which may operate as a Bluetooth transmitter/receiver, i.e., transceiver, and which may be configured to implement embodiments of the invention. The computer system 102 includes various standard components, such as at least one processor and memory, a display, and other various hardware/software, as is standard in computer systems. The computer system 102 includes a Bluetooth transmit/receive, i.e., transceiver, device (200, FIG. 2) which is configured to operate as described herein.

The computer system 102 communicates with one or more peripheral devices, such as Bluetooth keyboard 112, Bluetooth mouse 114 and/or Bluetooth headset 116, as shown. Each of the peripheral devices 112, 114, 116 may be battery (or other portable energy source) operated devices that communicate in a wireless fashion with the host computer 102.

Other types of wireless devices are contemplated, such as any of various types of computer systems, smart phones or other mobile phones, microphones, speakers, digital cameras, light pens, joysticks, fax machines, printers, Global Positioning System (GPS) receivers, personal digital assistants (PDAs), digital audio and/or video players, and video game consoles, among others. Note further that in some embodiments, instead of, or in addition to, a processor and memory, the wireless device may utilize some other type of functional, e.g., a programmable hardware element, such as a field programmable gate array (FPGA), an ASIC (application specific integrated circuit). As used herein, the term "functional unit" refers to a component (or components) comprising hardware and/or software, and capable of performing specified functionality.

As noted above, FIG. 1 is only an example, and embodiments may operate with any of various combinations of devices communicating with each other in a wireless fashion.

Figure 2:
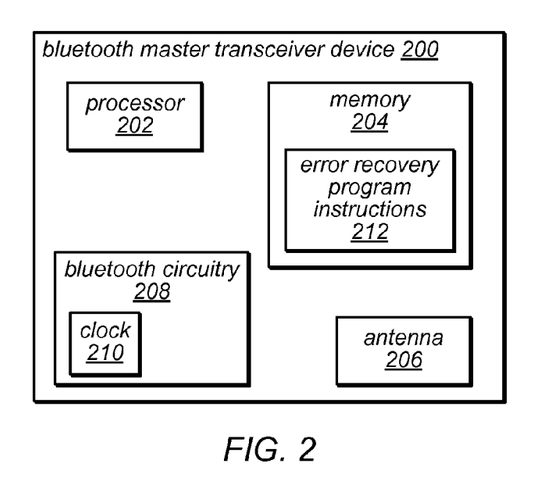
FIG. 2 is a block diagram of a Bluetooth master transmitter device according to one embodiment.

FIG. 2 is a block diagram of example Bluetooth master transceiver device 200 which may be comprised in any of the Bluetooth devices shown in FIG. 1. The Bluetooth master transceiver device 200 may be configured to operate as a master transmitter (or transceiver) device. As shown, the Bluetooth device 200 may comprise a functional unit, e.g., a processor 202 coupled to a memory 204, although other types of functional unit may be used as desired, e.g., a programmable hardware element, such as a field programmable gate array (FPGA), an ASIC (application specific integrated circuit), and so forth, as desired. The Bluetooth device 200 may also comprise an antenna 206 and various Bluetooth circuitry 208 for implementing Bluetooth communications, including a clock 210, e.g., a low power oscillator. It should be noted that in other embodiments, the clock may be implemented in any of a variety of ways, and further, may be located elsewhere in the device.

The memory 204 may store various types of program instructions for operation of the Bluetooth device 200. As shown, the memory 204 may also store error recovery program instructions 212. The error recovery program instructions 212 may be executable by the processor 202 to perform embodiments of the methods and functions described herein, e.g., the methods and functions described in the flowcharts and timing diagrams of FIGS. 3-7. Alternatively, the error recovery functionality disclosed herein may be implemented in hardware, e.g., via appropriately configured programmable hardware, e.g., an FPGA, or other logic, or a combination of software and hardware, as desired. More generally, the error recovery functionality may be implemented via a functional unit.

Figure 3:
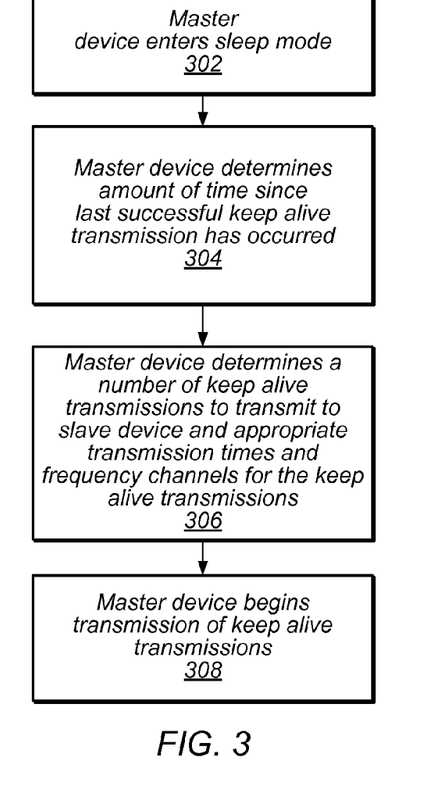
FIG. 3 is a flowchart diagram of a method of recovery from sleep clock errors, according to one embodiment.

FIG. 3 is a flowchart diagram illustrating operation of one embodiment of a method for recovering from a clock error. The method may be performed by a Bluetooth device operating as a master transmitter, such as computer system 102. A master wireless device may enter sleep mode (302), e.g., sniff mode for Bluetooth embodiments. The master wireless device is wirelessly coupled to at least one slave wireless device, also in sleep mode. The master and slave wireless devices may enter sleep mode because the at least one slave wireless device is idle and decides to enter sleep mode (i.e., low power sleep mode, or sniff mode), e.g., to conserve battery power. For example, where the slave wireless device is a Bluetooth keyboard, and the user has not entered any input to the keyboard (has not pressed any keys on the keyboard) for a predetermined amount of time, the Bluetooth keyboard may enter sleep (e.g., sniff) mode.

The master wireless device determines the amount of time since a last successful keep alive transmission with the at least one slave wireless device has occurred (304). Success, in some embodiments, is defined as a transmission followed by a receipt acknowledgment. In some embodiments, the passage of a specified amount of time since detection of a last keep alive transmission will trigger the operations depicted in blocks 306-308, which are described below. The master wireless device determines a number of keep alive frames to transmit to the slave wireless device, and appropriate times at which and frequency channels on which to transmit the keep alive transmissions (306). In some embodiments, the number of keep alive frames is plural. In some embodiments, the master wireless device determines the number of keep alive transmissions to transmit to the slave wireless device based on the amount of time since a last keep alive transmission has occurred, as determined in block 304.

In determining the number of keep alive transmissions to transmit to the slave wireless device in block 306, the master wireless device may examine a data structure, such as the table of FIG. 4, discussed below. The master wireless device may also determine the appropriate transmission times for the keep alive frames by examining the data structure. The data structure may be stored in the error recovery program instructions 212 of memory 204. The master device begins transmission of the selected number of keep alive frames (308). The operations performed in blocks 306-308 are capable of being repeated in response to repeated failures to detect a transmission from a slave device, and, in some embodiments, the transmission times for various repetitions are capable of being differently spaced in response to conditions at the time of respective repetitions. Additionally, some embodiments may adjust an expected or predicted clock drift rate to recalculate transmission numbers and spacings in response to repeated executions of the operations discussed above with respect to blocks 306-308.

Figure 4:
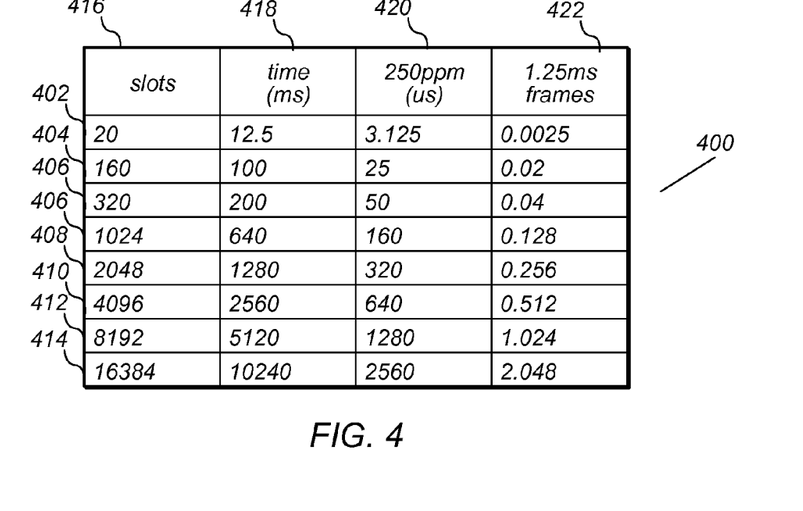
FIG. 4 depicts a chart of time relationships for sleep mode transmissions between the master wireless device and a slave device, according to one embodiment.

FIG. 4 depicts a chart of time relationships for sleep mode transmissions (keep alive transmissions) between the master wireless device and a slave device, according to one embodiment. Table 400 reflects a series of values used to determine when sending a set of multiple keep alive packets (or sniff frames) 1.25 milliseconds apart is likely to result in successful clock recovery. Table 400 reflects a slot period of 625 microseconds. For each of table entries 402-414, a number of slots is indicated in a slot column 416. For each of table entries 402-414, a time column 418 indicates an amount of time for the number of 625 microsecond slots indicated in slot column 416.

For each of table entries 402-414, an error column 420 indicates the magnitude of an error reflected by an allowed error tolerance or predicted clock drift error range. In the case of table 400, an error tolerance of 250 ppm of predicted clock drift error rate is reflected in error column 420. Error column 420 shows, for each selected number of slots in slot column 416 of entries, the amount of error that would result from a crystal that was incorrect by 250 ppm. If an LPO frequency is misadjusted by 250 ppm, the amount listed in error column 420 is the expected or predicted clock drift. Error column 420 is calculated by multiplying time column 418 by the acceptable error fraction (e.g., clock drift rate), which in the case of table 400, for entry 402 works out to multiplying 12.5 milliseconds, the value of time column 420, by 250 and dividing by one million to generate the value of 3.125 microseconds in error column 420.

Error frame column 422 represents a conversion of the error listed in error column 420 to an equivalent number of Bluetooth transmission frames. A frame is composed of two slots. As discussed above, the slot period is 625 microseconds. Thus, each frame is 1.25 milliseconds. Bluetooth devices keep time in slots and frames. Sniff intervals, for example, are typically expressed in frames or slots. For example, a sniff interval can be calculated as 20 slots (or 160 or 320). Each of entries 402 provides the number of frames of potential drift in error frame column 422 for a given sniff interval in slot column 416. The value of slot column 416 can be thought of as a synch period representing how many slots have elapsed since a last contact with a slave device.

Table 400 demonstrates that, as the sniff period increases, the potential length of time associated with an error represents an increasing number of frames. Determining the relationship between the sniff period and the potential length of time associated with an error enables determination of the number of keep alive messages (sniff packets) that can be sent to increase probability of interaction with the slave device. Given a belief that an LPO is accurate to 250 ppm, then after 16000 slot periods, an uncertainty of roughly +/−2 frames will have developed. In some embodiments, if the device determines that the possible error in LPO frequency could be as high as 1000 ppm, for example, then this column's values could be multiplied by 4, giving an uncertainly of roughly +/−8 frames across 16000 slot periods. A number of master transmissions to send is then capable of being determined as a reflection of the expressed error.

Figure 5:
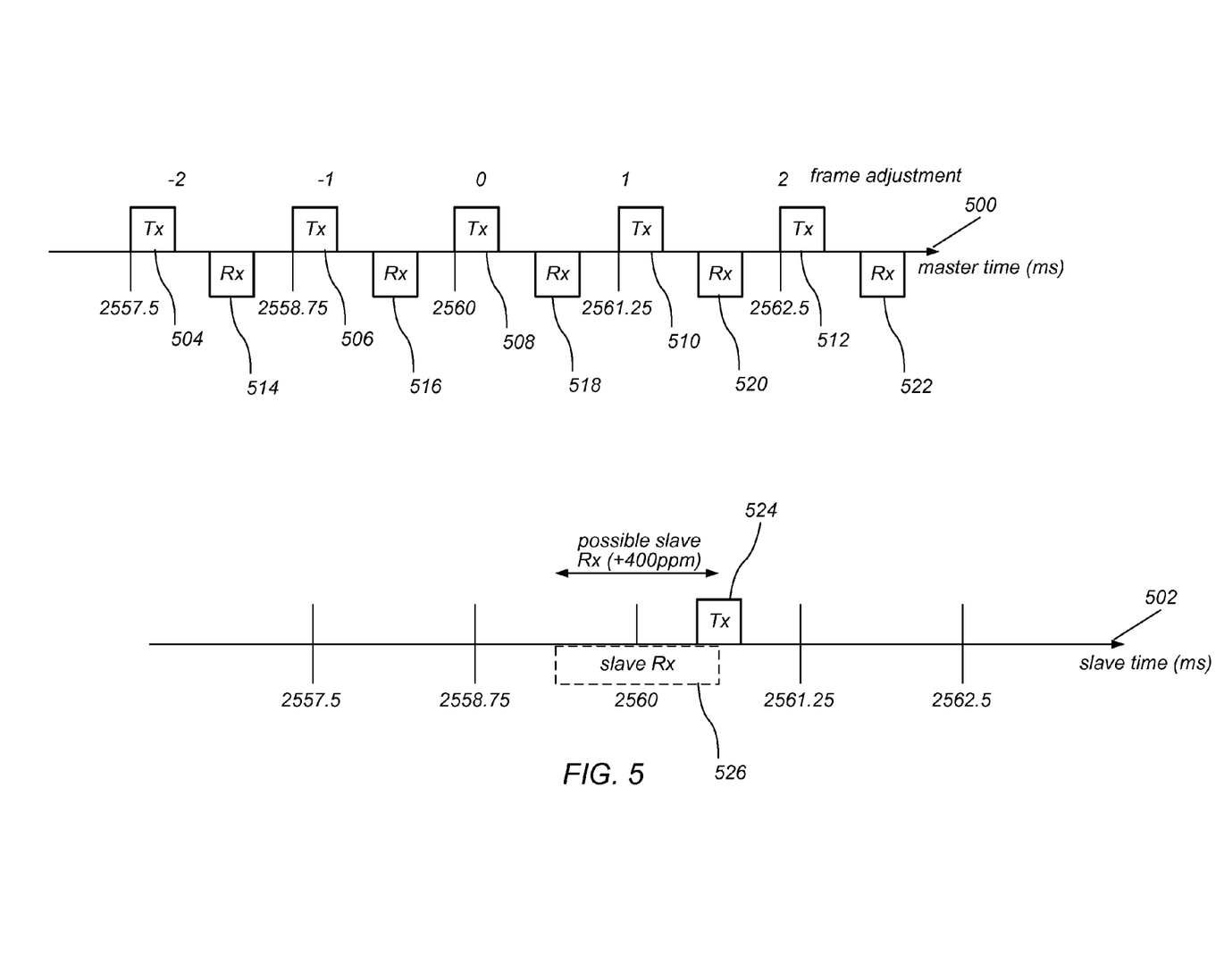
FIG. 5 illustrates an example timing diagram for planned sleep mode transmissions between the master wireless device and a slave device, according to one embodiment.

FIG. 5 illustrates an example timing diagram for planned keep alive transmissions between the master wireless device and a slave device, according to one embodiment. FIG. 5 includes a master timeline 500 and a slave timeline 502. Master timeline 500 includes a series of transmit windows 504-512 and receive windows 514-522. Slave timeline 502 includes a transmit window 524 and a receive window 526.

In the example portrayed in FIG. 5, a master clock has encountered an error placing master timeline 500 at a time 400 ppm out of alignment with slave timeline 502. To recover a communications link between a master device and a slave device, the master determines that the master device will transmit up to 5 keep alive transmissions at transmit windows 504-512. The Bluetooth resource manager (BRM) of the master device wakes the master system 2 slots earlier than normal, e.g., at transmit window 504, adjusts the frame count by 2, and requests that Bluetooth circuitry generate a keep alive transmission. If no reply from the slave device is received, the BRM will again adjust the frame count to the sleep time location and retransmit at transmit window 506. Transmissions are planned to occur up to 5 times in the above example, at approximately −1000 ppm (transmit window 504), −500 ppm (transmit window 506), on-time (transmit window 508), +500 ppm (transmit window 510), and +1000 ppm (transmit window 512). In the example of FIG. 5, the slave clock is 400 ppm out of alignment with the master clock, so the fourth transmission at transmit window 510 will arrive in slave receive window 526 and will be replied to with slave transmission 524, which is received at master receive window 520.

Once a sleep response is found, the master may adjust its clock to be the clock creating the sniff transmission that the slave responded to, and the link can continue. Adjusting the master clock embodies an assumption that the master clock is in error, and that by adjusting the master clock to match the slave clock, the master clock is corrected. However, even if the error was in the slave clock, resynchronization to the slave clock will provide benefit in many applications. Embodiments help to increase the likelihood that, because the clocks are re-aligned, the link is maintained. Synchronous links, such Synchronous Connection Oriented (SCO) links, which might suffer in such a case, are used in embodiments that tend not to be actively sending time-sensitive synchronous data while in sleep, without any responses for comparatively long periods of time. In some embodiments, sleep transmissions at transmit windows 504-512 are treated as priority frames. If the transmissions are pre-empted by other Bluetooth or WLAN traffic (via coexistence interfaces), the following sleep period will also utilize sleep recovery if no sleep response is found.

As an alternative to sending keep alive transmissions in every frame, the transmitter can optionally choose to transmit in some frame periods in one sleep anchor, and then in other sleep periods in another sleep anchor. For example, the transmitter could choose to send in even frame offsets (−4, −2, 0, 2, 4) at one sleep anchor and then odd frame offsets in the next anchor. Such embodiments may be chosen to save power and may prove useful if the device has gone for more than 5 seconds without a sleep response, as the slave will now have a window open for more than 1 entire frame period. Such embodiments may also prove useful if the master has other Bluetooth traffic to send, or if WLAN traffic on a coexistence interface needs the medium for some traffic.

One skilled in the art will realize, in light of having read the present disclosure, that while the transmissions portrayed in FIG. 5 are aligned to correspond to frame boundaries, some embodiments include transmissions that straddle frame boundaries by adjusting the resolution of a clock in hundreds-of-microsecond increments without departing from the scope of the present disclosure. Additionally, while the example embodiments disclosed herein are explained for the sake of simplicity with respect to a single master and a single slave, one skilled in the art will realize in light of having read the present disclosure that embodiments supporting multiple slaves may be implemented without departing from the scope of the present disclosure. Solutions for accommodating multiple sniff links may include support for recovery with respect to only a single link of multiple master-slave relationships. Further, some embodiments implement multiple master clocks for multiple slave links.

Figure 6:
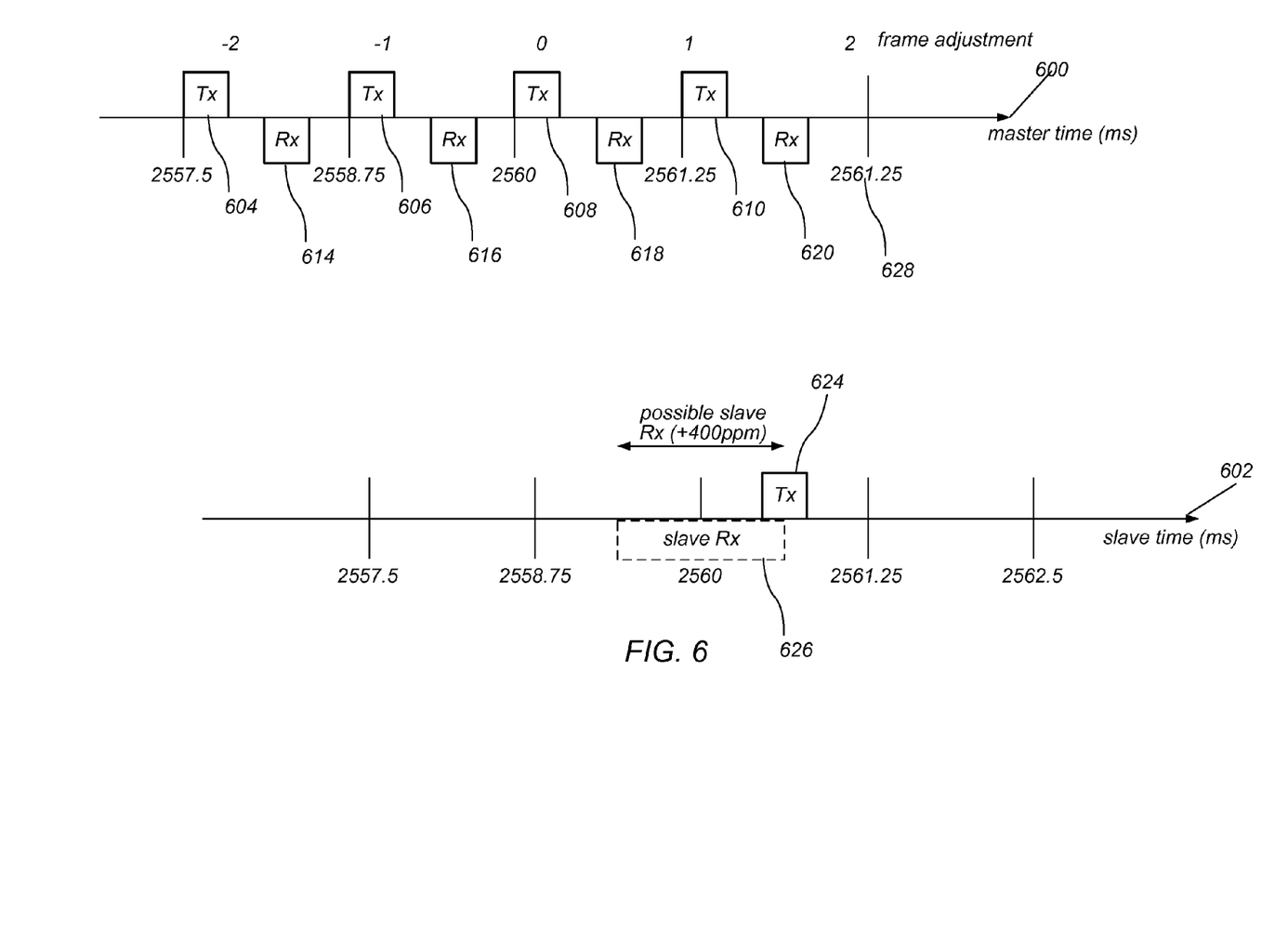
FIG. 6 illustrates an example timing diagram for actual sleep mode transmissions between the master wireless device and a slave device, according to one embodiment.

FIG. 6 depicts an example result timing diagram for the planned time diagram displayed in FIG. 5. FIG. 6 includes a master timeline 600 and a slave timeline 602. Master time frame 600 includes a series of transmit windows 604-610 and receive windows 614-620. Slave timeline 602 includes a transmit window 624 and a receive window 626.

In the example portrayed in FIG. 6, a master clock has encountered an error placing master timeline 600 at a 400 ppm offset with respect to slave timeline 602. To recover a communications link between a master device and a slave device, the master plans to transmit up to 5 sleep transmissions, though only four are actually transmitted, at transmit windows 604-610. The BRM of the master device wakes the master system 2 slots earlier than normal, e.g., at transmit window 604, adjusts the frame count by 2, and requests that Bluetooth circuitry generate a sleep transmission. If no reply is received from the slave, the BRM again adjusts the frame count to the sleep time location and retransmit at transmit window 606. This is planned to happen up to 5 times in the above example, at approximately −1000 ppm (transmit window 604), −500 ppm (transmit window 606), on-time (transmit window 608), +500 ppm (transmit window 510), and +1000 ppm (not shown due to cancellation). In the example, the slave clock is 400 ppm different from the master clock, so the fourth transmission at transmit window 510 will arrive in slave receive window 626 and will be replied to with slave transmission 624, which is received at master receive window 620.

Once a sleep response is found, the master may adjust its clock to the slave clock, and the link can continue, as is reflected in adjusted time value 628. The assumption thereby embodied is that the master clock is in error, and by adjusting to the slave clock, the master clock is now corrected.

Figure 7:
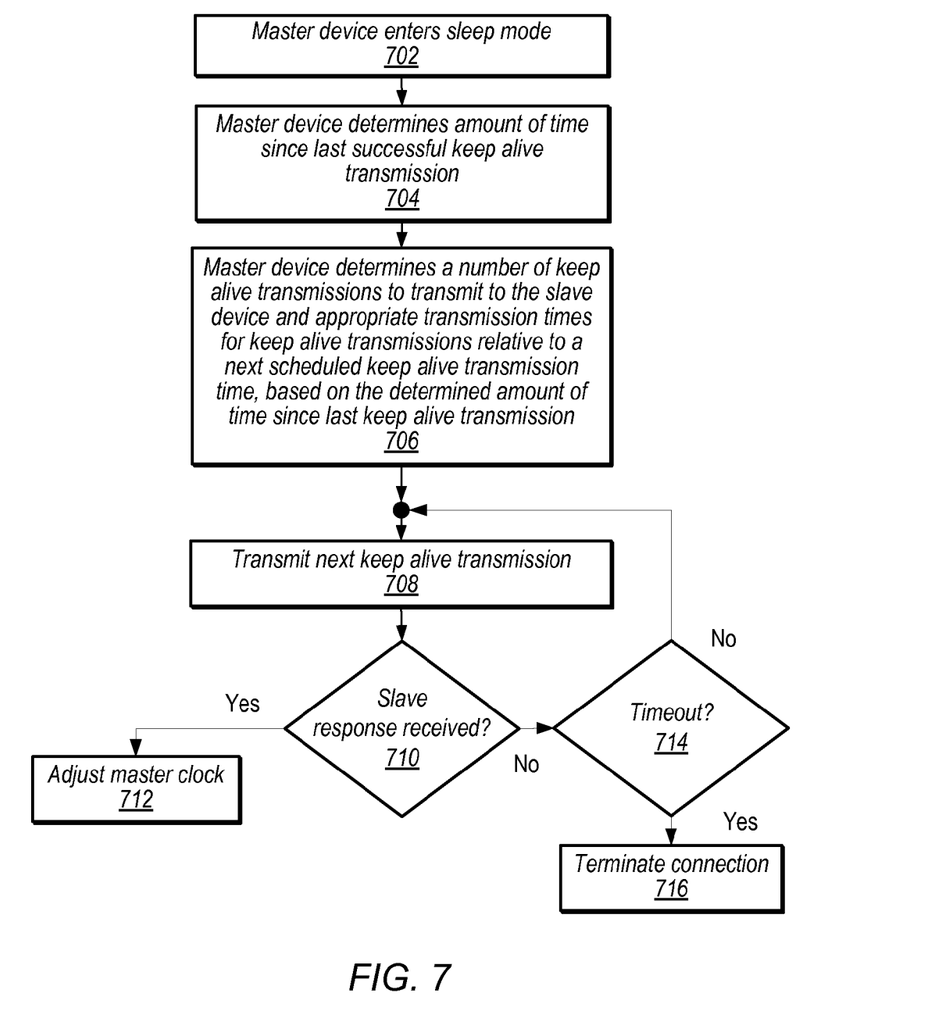
FIG. 7 is a flowchart diagram of a method of recovery from sleep clock errors, according to one embodiment.

FIG. 7 is a flowchart diagram of a method of recovery from sleep clock errors, according to one embodiment. The method may be performed by a Bluetooth device operating as a master transmitter, such as computer system 102. A master wireless device may enter sleep mode (702), e.g., sniff mode for Bluetooth embodiments. The master wireless device is wirelessly coupled to at least one slave wireless device, also in sleep mode. The master and slave wireless devices may enter sleep mode because the at least one slave wireless device is idle and decides to enter sleep mode (i.e., low power sleep mode, or sniff mode), e.g., to conserve battery power. For example, where the slave wireless device is a Bluetooth keyboard, and the user has not entered any input to the keyboard (has not pressed any keys on the keyboard) for a predetermined amount of time, the Bluetooth keyboard may enter sleep (e.g., sniff) mode.

The master wireless device determines the amount of time since a last successful keep alive transmission with the at least one slave wireless device has occurred (704). Success, in some embodiments, is defined as a transmission followed by a receipt acknowledgment. The master wireless device determines a number of sleep frames to transmit to the slave wireless device and appropriate times to transmit the plurality of keep alive transmissions (706). Additionally, in some embodiments, appropriate channel frequencies are determined. In some embodiments, the number of sleep frames is plural. In some embodiments, the master wireless device may determine the number of keep alive transmission to transmit to the slave wireless device based on the amount of time since a last keep alive transmission has occurred, as determined in block 704.

In determining the number of keep alive transmissions to transmit to the slave wireless device in 706, the master wireless device may examine a data structure, such as the table of FIG. 4, discussed above. The master wireless device may also determine the appropriate transmission times for the sleep frames by examining the data structure. The master wireless device may, in some embodiments, also consider the amount of time remaining until a link supervision timeout. In such embodiments, more aggressive transmission of multiple sniff frames may be appropriate as a response to the approach of a link supervision timeout. The data structure may be stored in the error recovery program instructions 212 of memory 204. The master device then transmits a sleep frame, also called a keep alive transmission (708).

A determination is made as to whether a slave response has been received (710). If a slave response has been received, a master clock is adjusted (712). If no slave response has been received, a determination is made as to whether the connection has timed-out (714). If the connection has timed out, the connection is terminated (716). If the connection has not timed out, then the process returns to block 708, which is described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
a functional unit;
a wireless transceiver and antenna, coupled to the functional unit;
a clock, coupled to the functional unit and the wireless transceiver, and configured to generate a clock signal;

wherein the wireless device is coupled wirelessly to at least one wireless slave device, wherein the functional unit is configured to:
  a) determine an amount of time since a last keep alive transmission with the at least one slave device has occurred based on the clock;
  b) determine a number of keep alive transmissions to transmit to the at least one slave device, and appropriate transmission times for the keep alive transmissions relative to a next scheduled keep alive transmission time, based on the determined amount of time since the last successful keep alive transmission; and
  c) begin successive transmission of the number of keep alive transmissions to the at least one slave device per the determined transmission times.

2. The wireless device of claim 1, wherein the functional unit is further configured to:
  determine appropriate frequency channels for the keep alive transmissions;
  receive a keep alive transmission from the at least one slave device in response to the at least one slave device receiving at least one of the number of keep alive transmissions; and
  cease successive transmission of the number of keep alive transmissions in response to receiving the keep alive transmission from the at least one slave device, thereby not transmitting any remainder of the number of keep alive transmissions.

3. The wireless device of claim 1, wherein the functional unit is further configured to:
  adjust the clock based on the received keep alive transmission from the at least one slave device, thereby synchronizing the clock to the at least one slave wireless device.

4. The wireless device of claim 1, wherein to determine the number of keep alive transmissions to transmit, the functional unit is configured to:
  determine the number of keep alive transmissions and appropriate transmission times further based on a predicted clock drift error rate.

5. The wireless device of claim 1, wherein the functional unit is configured to perform a)-c) in response to failing to detect a keep alive transmission from the at least one slave device for a specified amount of time.

6. The wireless device of claim 5, wherein the functional unit is further configured to:
  perform a)-c) a plurality of repetitions, each time in response to a respective failure to detect a keep alive transmission from the at least one slave device for the specified amount of time, wherein the appropriate transmission times for at least two of the plurality of repetitions are different.

7. The wireless device of claim 1, wherein the functional unit is further configured to:
  increase the predicted clock drift rate in response to failing to detect a keep alive transmission from the at least one slave device after performing a)-c) a specified number of times.

8. The wireless device of claim 1, wherein each transmission of the number of keep alive transmissions occurs on a transmission frame boundary.

9. The wireless device of claim 1, wherein the functional unit comprises:
  a processor; and
  a memory, coupled to the processor.

10. The wireless device of claim 1, wherein the functional unit comprises one or more of:
  a programmable hardware element; or
  an application specific integrated circuit (ASIC).

11. A method for recovering from a sleep clock error, the method comprising:
  a wireless master device determining an amount of time since a last keep alive transmission with respect to a wireless connection to at least one slave device has occurred based on a clock;
  determining a number of keep alive transmissions to transmit to the at least one slave device, and appropriate transmission times for the keep alive transmissions relative to a next scheduled keep alive transmission time, based on the determined amount of time since the last successful keep alive transmission; and
  beginning successive transmission of the number of keep alive transmissions to the at least one slave device per the determined transmission times.

12. The method of claim 11, further comprising:
  determining appropriate frequency channels for the keep alive transmissions; and
  receiving a keep alive transmission from the at least one slave device in response to the at least one slave device receiving at least one of the number of keep alive transmissions; and
  ceasing successive transmission of the number of keep alive transmissions in response to receiving the keep alive transmission from the at least one slave device, thereby not transmitting any remainder of the number of keep alive transmissions.

13. The method of claim 11, further comprising:
  adjusting the clock based on the received keep alive transmission from the at least one slave device, thereby synchronizing the clock to the at least one slave wireless device.

14. The method of claim 11, wherein the determining the number of keep alive transmissions to transmit further comprises determining the number of keep alive transmissions and appropriate transmission times based on a predicted clock drift error rate.

15. The method of claim 11, wherein each transmission of the number of keep alive transmissions occurs on a transmission frame boundary.

16. A non-transitory computer-readable storage medium storing program instructions that when executed cause one or more computers to implement a method, the method comprising:
  a wireless master device determining an amount of time since a last keep alive transmission with respect to a wireless connection to at least one slave device has occurred based on a clock;
  determining a number of keep alive transmissions to transmit to the at least one slave device, and appropriate transmission times for the keep alive transmissions relative to a next scheduled keep alive transmission time, based on the determined amount of time since the last keep alive transmission; and
  beginning successive transmission of the number of keep alive transmissions to the at least one slave device per the determined transmission times.

17. The non-transitory computer-readable storage medium of claim 16, wherein the method further comprises:
  receiving a keep alive transmission from the at least one slave device in response to the at least one slave device receiving at least one of the number of keep alive transmissions; and ceasing successive transmission of the number of keep alive transmissions in response to receiving the keep alive transmission from the at least one slave device, thereby not transmitting any remainder of the number of keep alive transmissions.

18. The non-transitory computer-readable storage medium of claim 16, wherein the method further comprises:
adjusting the clock based on the received keep alive transmission from the at least one slave device, thereby synchronizing the clock to the at least one slave wireless device.

19. The non-transitory computer-readable storage medium of claim 16, wherein the determining the number of keep alive transmissions to transmit further comprises determining the number of keep alive transmissions and appropriate transmission times based on a predicted clock drift error rate.

20. The non-transitory computer-readable storage medium of claim 16, wherein each transmission of the number of keep alive transmissions occurs on a transmission frame boundary.

\* \* \* \* \*